United States Patent Office 3,397,903
Patented Aug. 20, 1968

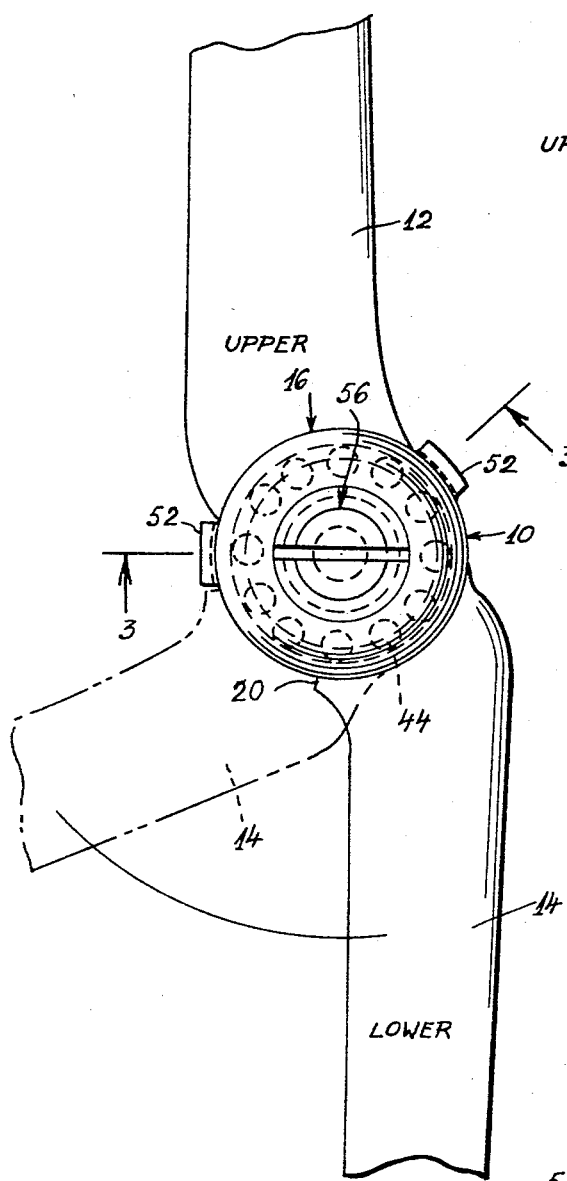
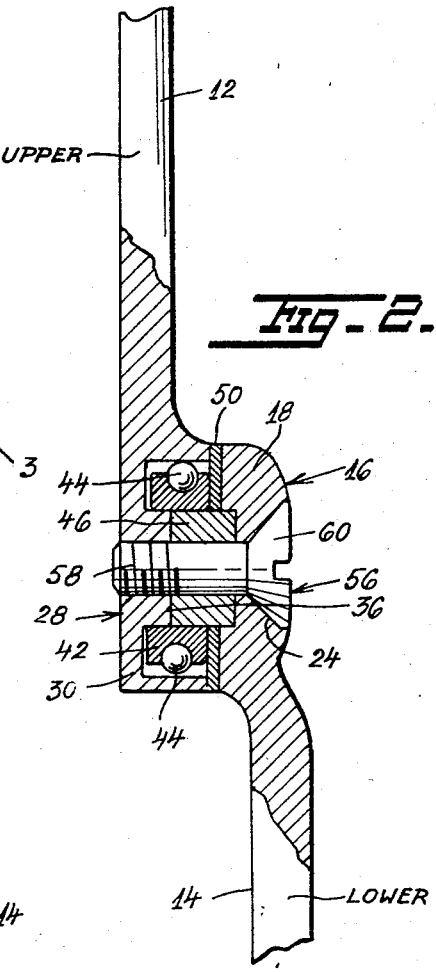
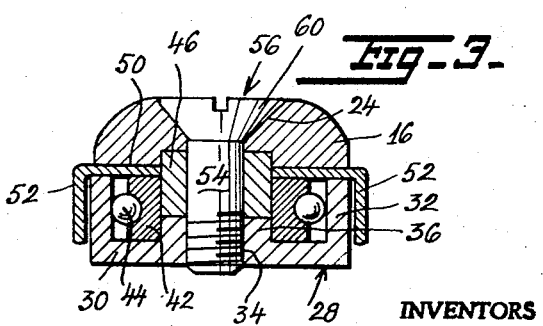

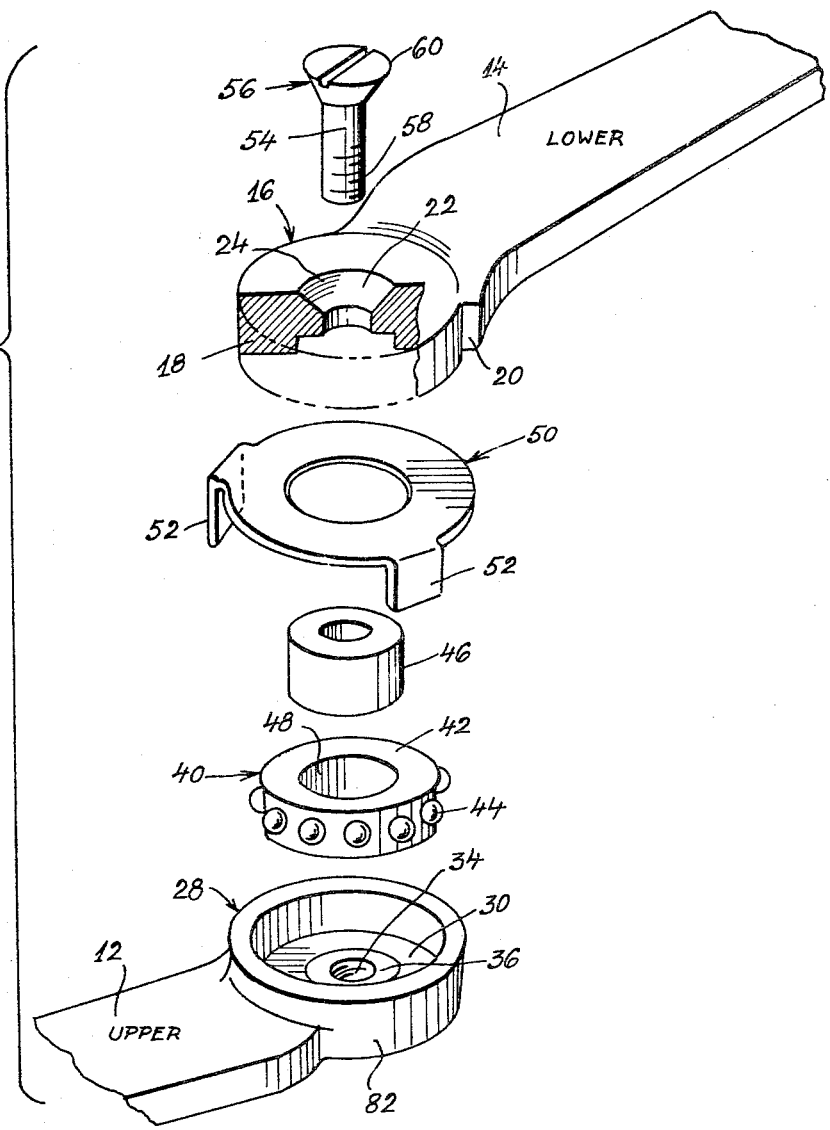
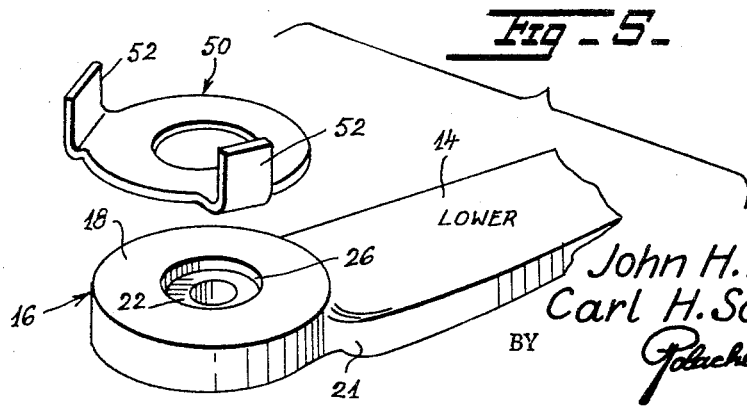

3,397,903
ARTIFICIAL LIMB JOINT
John H. Archdale, 424 S. Charlton St. 61605, and Carl H. Schmidgall, 307 Western St. 61604, both of Peoria, Ill.
Filed June 13, 1966, Ser. No. 557,176
4 Claims. (Cl. 287—101)

This invention relates to hinge joints such as are commonly employed in artificial limbs and more particularly to new and useful improvements in a knee joint.

Heretofore a knee joint comprises a pair of elongated shank members with knuckles at one end thereof hingedly connected to each other. The hinge connection included an upwardly extending sleeve on one of the knuckles which is interiorally screw threaded while the other knuckle fits about the said sleeve. These knuckles are formed with a pair of complemental grooves which together define a ball race in which are located ball bearings. A threaded stem holds the knuckles in assembled relation. Such joints very easily become unscrewed resulting in a disassembly of the hinge joint, which might be accompanied with disastrous results. Various means have been proposed to prevent this unscrewing but such efforts with which applicants are aware have not proven satisfactory. It is therefore an important object of the present invention to provide a single joint with means for maintaining the joint assembled.

Another object of the invention is to provide a knee joint that will not accidentally work loose but in which the parts will remain in the positions to which they are adjusted until a subsequent adjustment is made.

Still another object of the invention is to provide a knee joint which is comparatively thin and which is provided with bearings whereby the action of the joint is rendered easy.

Yet another object of the invention is to provide a knee joint wherein the interfitting parts are in substantial engagement with one another and serve to properly transmit the stresses and strains through the joint.

Other objects of the invention are to provide a knee joint which is dependable in operation, is comfortable when the wearer is standing, provides automatic release of the grip when taking a sitting position and protects the clothing from becoming pinched in the joint.

For further comprehension of the invention and of the objects and advantages thereof, reference will be had to the following description and accompanying drawings and to the appended claims in which the various novel features of the invention are more particluraly set forth.

In the accompanying drawings forming a material part of this disclosure:

FIGURE 1 is a top plan view of a knee joint embodying our invention, one of the shank members being shown in moved position in dash lines.

FIG. 2 is a vertical sectional view through the knee joint at the center thereof.

FIG. 3 is a sectional view taken on the plane of the line 3—3 of FIG. 1.

FIG. 4 is a perspective disassembled view of the knee joint, and

FIG. 5 is a disassembled perspective view of the lower shank member and lock ring shown in inverted position.

Referring now in detail to the various views of the drawings, in FIG. 1 a knee joint embodying the invention is shown and designated generally at 10. The knee joint provides articulation between the upper and lower shank members 12 and 14, respectively, which are attached to the artificial leg proper and the lacer support, respectively. As is known in below-knee amputation artificial legs, the leg proper is below the knee joint, the lacer support is above the knee joint, and the hinge joint is in transverse alignment with the knee joint.

The lower shank member 14 is formed at one end with a knuckle 16 having a solid circular body 18. Adjacent the knuckle 16, the shank member 14 is formed with a flat shoulder 20 at one side and with a curved shoulder 21 at the other side, which shoulders limit the swinging action of the joint in a manner to be hereinafter described in detail. Referring now in detail to FIG. 4, the body of the knuckle 16 is shown as being formed with a central smooth bore 22 having an upper countersunk portion 24. The bottom surface of the body of the knuckle is formed with a recess 26 around the bottom end of the bore 22 as best seen in FIG. 5.

The upper shank member 12 is formed at one end with a knuckle 28 having a shallow dish-shaped hollow body with circular thin flat base 30 and an outstanding annular side wall 32. The base is formed with a central threaded opening 34 with an outstanding annular hub 36 therearound.

The knuckles 16 and 28 are hingedly connected to each other by a hinge assembly best seen in FIG. 4. This hinge assembly includes a thrust ball bearing member 40 seated on the base 30 of the knuckle 28 of upper member 12 and rotatable around the hub 36. The bearing member 40 includes an annular cage 42 with balls 44 supported thereby and protruding outwardly thereof in engagement with the inner surface of the annular side wall 32 of the knuckle 28 as best seen in FIG. 3. A tubular bearing member 46 has one end force fitted into the central bore 48 of the cage 42 protruding therebeyond. A flat locking ring 50 is slipped over the protruding end of the tubular member 46 and rests on the outer surface of the annular side wall 32 of the knuckle 28. The ring 50 is formed with a pair of downwardly extending plate-like abutting and fastening lugs 52 disposed in spaced relation around the periphery of the circular body of the ring approximately 190° apart. The lugs 52 grip the outer sides of the side wall 32 to hold the locking ring against displacement, and are positioned in the path of movement of the shoulders 20 and 21 on the lower shank member 14 so as to limit rotation of said shank member in both directions.

The body 18 of the knuckle 16 of shank member 14 is positioned over the other end of tubular bearing member 46 in force fitting relation, with the bores in the body 18, tubular bearing member 46 and hub 36 of base 30 of knuckle 28 in alignment as seen in FIG. 2. The smooth portion 54 of the shank of a screw 56 extends through the aligned openings in the body 18, and tubular bearing member 46, and its threaded end portion 58 is threaded into the hub 36 and bore of the base 30 of knuckle 28. The screw has a tapered head 60 seated in the tapered countersunk portion 24 of the bore 22 in the body 18 of knuckle 16.

As will be seen from FIG. 2, the body 18 of knuckle 16 of shank member 14, the tubular bearing 46 and the thrust bearing member 40 are locked together as a unit around the smooth portion 54 of screw 56 whereby the set of balls 44 roll around between the cage 42 and the inner surface of the side wall 32 of knuckle 28 on shank member 12. When the body 18 of knuckle 16 of shank member 14 rotates around the screw 56, the shoulder 20 of shank member 14 is adapted to engage one of the lugs 52 on locking ring 50 to limit rotation of the shank member in that particular direction, and the other shoulder 21 is adapted to engage the other lug 52 when the shank member is moved in the opposite direction thereby limiting such movement in that particular direction.

The exterior surface of the hub 36 of knuckle 28 of shank member 12 and the interior of the cage 42 of the bearing member 40 are very accurately machined for with the locking arrangement provided there is no locking of these parts combined. Also the exterior surfaces of the knuckles 16 and 28 are very accurately machined as well as the shoulders on the lower shank member. This accurate machine insures of a proper transmission of stresses and strains through the joint without the weakening of any particular parts.

While we have illustrated and described the preferred embodiments of our invention, it is to be understood that we do not limit ourselves to the precise construction hereindisclosed and that various changes and modfications may be made within the scope of the invention as defined in the appended claims.

What is claimed is:

1. In a hinge joint for artificial limbs and the like, a pair of shank members, knuckles on one end of the shank members in juxtaposition with each other, one knuckle having a circular solid body with a central bore therein, the other knuckle having a circular cup-shaped hollow body with a central bore therein, means interposed between the knuckles and coacting with the central bores for hingedly connecting the knuckles whereby one knuckle is adapted to rotate relative to the other knuckle and means for limiting the rotation of said one knuckle; the means for hingedly connecting the knuckles includes an annular thrust bearing member carrying spaced ball bearings on the outer periphery and mounted in the hollow body of said other knuckle with said ball bearings engaging the inner periphery of said hollow body, the solid body of said one knuckle having a recess in one surface around the bore therein, and a tubular bearing interposed between and pressed in the inner periphery of the annular thrust bearing member and the recess in the solid body of said one knuckle.

2. A hinge joint structure as defined in claim 1 wherein the means for limiting the rotation of said one knuckle includes shoulders on the shank member bearing said one knuckle and abutments fastened to the other knuckle in the path of movement of said shoulders.

3. A hinge joint structure as defined in claim 2 wherein the abutments are constituted by a locking ring interposed between the solid body of said one knuckle and the annular side wall of said other knuckle, and spaced bent lugs on the outer periphery of the locking ring gripping the outer surface of said annular side wall, said lugs being disposed in the path of movement of the shoulders on the shank member.

4. In a joint for artificial limbs and the like, a pair of shank members, knuckles on one end of the shank members, in juxtaposition with each other, one knuckle having a circular solid body with a central bore therein, the other knuckle having a circular cup-shaped hollow body with a central bore therein, means interposed between the knuckles and coacting with the central bores for hingedly connecting the knuckles whereby one knuckle is adapted to rotate relative to the other knuckle and means for limiting rotation of said one knuckle, the central bore in the body of said one knuckle has a countersunk portion at one end in one surface, said solid body have a recess around the other end of the bore in the other surface thereof, the circular body of the other knuckle having a circular base and outwardly extending annular side wall, the bore in said body being interiorally threaded, an outwardly projecting threaded hub around said threaded bore, and wherein the means for hingedly connecting the knuckles includes a hinge assembly including a thrust ball bearing member seated on the base of said other knuckle around the threaded hub thereof, said thrust bearing member constituted by an annular cage carrying spaced balls engaging the inner surface of the side wall of said other knuckle, a tubular bearing member having one end fitted in the inner peripheral wall of the cage, the other end of the tubular bearing member extending outwardly of the cage, the other end of said tubular bearing member force-fitted into the recess in said one knuckle, and a screw having a smooth shank portion extending through the aligned openings in said one knuckle, said tubular bearing, said hub and said bore in the base of said other knuckle, the threaded end of the screw engaging the threads in the bore in the base and the threads in the hub around said bore.

References Cited

UNITED STATES PATENTS

| 994,583 | 6/1911 | Flanders. | |
| 2,037,992 | 4/1936 | McCann | 287—101 |
| 2,134,288 | 10/1938 | McCann | 287—101 |

CARL W. TOMLIN, *Primary Examiner.*

ANDREW KUNDRAT, *Assistant Examiner.*